United States Patent [19]

Delhomme

[11] Patent Number: 5,057,021

[45] Date of Patent: Oct. 15, 1991

[54] ARROW-PLOT WITH COLOR CODED AZIMUTH

[75] Inventor: Jean-Pierre Delhomme, Boulogne-Billancourt, France

[73] Assignee: Schlumberger Technology Corporation, New York, N.Y.

[21] Appl. No.: 466,807

[22] Filed: Jan. 18, 1990

[30] Foreign Application Priority Data

Jan. 18, 1989 [FR] France ................. 89 00529

[51] Int. Cl.$^5$ ............................................. G09B 25/00
[52] U.S. Cl. ........................................ 434/430; 367/70
[58] Field of Search ............ 434/430; 40/612; 33/1 E, 1 C, 1 H, 1 HH, 1 SD; 367/70

[56] References Cited

U.S. PATENT DOCUMENTS

| 486,192 | 11/1892 | Keating | 116/326 |
|---|---|---|---|
| 1,806,156 | 5/1931 | Fox | 116/325 |
| 3,720,008 | 3/1973 | Hur | 434/430 |
| 3,841,260 | 10/1974 | Sharp et al. | 116/325 |
| 3,844,042 | 10/1974 | Hodge | 33/1 SD |
| 4,196,474 | 4/1980 | Buchanan et al. | 364/461 |
| 4,228,529 | 10/1980 | Hsu et al. | 367/70 |
| 4,279,026 | 7/1981 | Lambright et al. | 367/70 |
| 4,303,975 | 12/1981 | Hepp | 364/422 |
| 4,348,748 | 9/1982 | Clavier et al. | 367/25 |
| 4,467,461 | 8/1984 | Rice | 367/70 |
| 4,517,835 | 5/1985 | Kerzner | 324/367 X |
| 4,791,618 | 12/1988 | Pruchnik | 367/29 |
| 4,811,220 | 3/1989 | McEuen | |
| 4,970,699 | 11/1990 | Bucker et al. | 367/70 |

FOREIGN PATENT DOCUMENTS

| 3424379 | 1/1986 | Fed. Rep. of Germany | 434/430 |
|---|---|---|---|
| 207040 | 10/1985 | Japan | 434/430 |
| 1468351 | 3/1977 | United Kingdom . | |
| 2073924 | 4/1981 | United Kingdom . | |

OTHER PUBLICATIONS

Oberto SERRA, *Fundamentals of Well-Log Imterpretation,* 1, "The Acquisition of Logging Data." Elsevier, 1984.

Primary Examiner—Richard J. Apley
Assistant Examiner—Rachel M. Healey
Attorney, Agent, or Firm—Leonard W. Pojunas

[57] ABSTRACT

A method of visually presenting information representative of the dip characteristics of earth formations by means of a polychromatic chart. The preferred method comprises representing the dip information by means of an arrow plot comprising oriented symbols such as a nail so that the location of each nail head and the orientation of its tips are respectively representative of the amplitude of the dip and the azimuth direction of the dip. Each nail head is colored as a function of the direction of the dip with the color selected from a palette comprising a plurality of colors corresponding to dip azimuth directions.

9 Claims, 2 Drawing Sheets

ARROW-PLOT WITH COLOR CODED AZIMUTH

BACKGROUND OF THE INVENTION

The invention relates to determining the dip of earth formations traversed by a borehole. It relates more particularly to a method of representing information relating to the dip of earth formations in the form of a polychromatic chart.

Dipmeter logs from boreholes have traditionally been used for defining the structural, stratigraphic, and sedimentological dip of earth formations. The design and operation of dipmeter logging tools, and the interpretation and graphic presentation thereof, are well known in this art, and will not repeated here. Reference is made to the book by Oberto Serra entitled *Fundamentals of Well-Log Interpretation*, Volume 1, "The Acquisition of Logging Data," (Elsevier, 1984). Chapter 19 of the Serra book, entitled "Dip Measurements (dipmeter logs)", at pages 269-302, is incorporated herein by reference thereto.

In conventional dipmeter logging, after the recorded data has been computer processed, results relating to the dip of the formations are usually presented in a graphic form which allows one to perceive the dip information visually. Among the possible visual presentations, the form which is used most often is called an "arrow-plot" and an example is shown in FIG. 1 (prior art). The X-axis of the arrow plot indicates dip angle, and the Y axis indicates depth along the borehole. Each data point on the arrow plot is represented by an oriented symbol having the appearance of a nail or tadpole. The head of the nail, by its (X,Y) coordinates, is a local indication of the dip angle as a function of depth, and the tip of the nail shows the direction of dip, with the upward direction indicating North. This type of presentation, often printed on paper, has long provided the hydrocarbon exploration industry an easy-to-read two-dimensional chart of three-dimensional logging information: depth, dip angle, and dip direction.

Referring again to FIG. 1 (prior art), some of the nails are coded black while some are white, to indicate the technical quality of the measurement which produced the dipmeter data. This additional presentation convention has been used in the art to distinguish "average" to "good" measurements (black coded nail heads, e.g. point 1 on FIG. 1) from poor measurements (white coded nail heads, e.g. point 2 on FIG. 1). It will readily be seen that in the use of such a coding scheme, the human eye is naturally drawn to the black nail heads and automatically tends to pay less attention to the white nail heads.

However, when all of the measurements are of very good quality, giving rise to a large density of black nail heads, the human eye is considerably less capable of perceiving and grasping the global information relating to dip direction. In addition, some nail heads may mask the tips of adjacent nails, and obscure the global or total information content of the log.

It is therefore an object of the invention to provide a method of presentation of log information of the above kind, which remedies the above-mentioned drawbacks.

It is additionally an object of the invention to provide a method of presentation of 3-dimensional well logging information in a 2-dimensional plot which avoids obscuring the total information content, while enhancing the visual perception of the most useful information by the human eye.

SUMMARY OF THE INVENTION

The present invention provides a method of globally representing information relating to dip by means of an arrow plot made up of nails, with the location of each nail head and the orientation of each nail tip being respectively locally representative of the amplitude of the dip and the azimuth direction of the dip, the method comprising the step of attributing a color to each nail as a function of the direction of dip, said color being selected from a palette providing a predetermined correspondence between dip azimuth directions and a plurality of colors.

The palette of colors is preferably a chromatic circle with azimuth references, said circle being organized such that two diametrically opposite colors are complementary. In a preferred embodiment of the invention, a color scheme is used having twelve basic colors with blue for north, red for east, yellow for south, and green for west.

In an alternative embodiment, each color is selected within a range of saturations varying from pale to saturated so that the saturation of the selected color is representative of the quality of the dip information.

BRIEF DESCRIPTION OF THE DRAWINGS

The invention will be better understood from reading the following detailed description made with reference to the accompanying drawings, in which.

The file of this patent contains a drawing executed in color. Copies of this patent with color drawing will be provided by the Patent and Trademark Office upon request and payment of the necessary fee.

DETAILED DESCRIPTION

Figure 1:
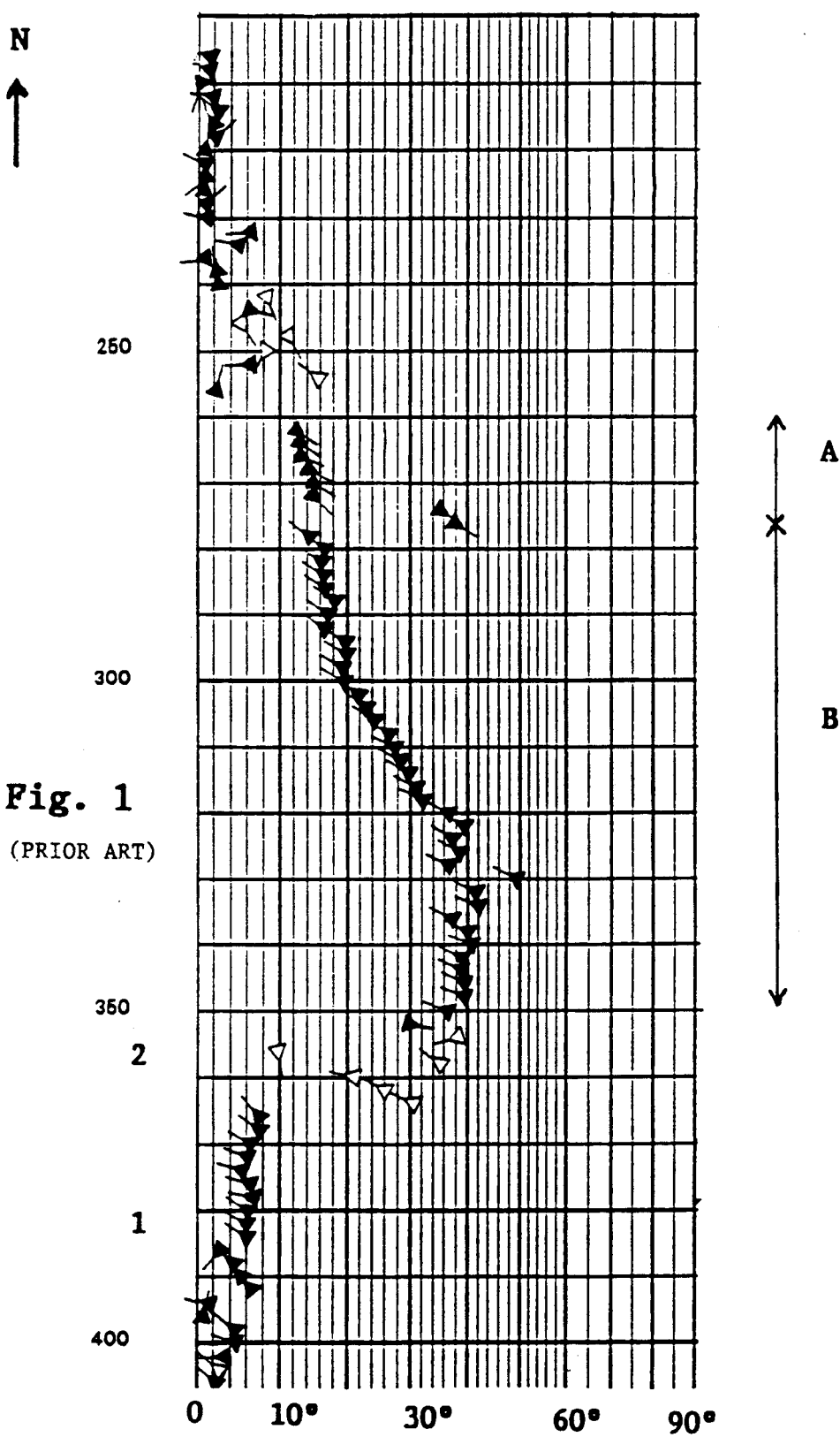
FIG. 1 is an arrow plot of prior art for representing the dip of earth formation as a function of depth.

FIG. 1 which is described in part above clearly shows the risk of confusion that can result when reading an arrow plot: the high density of nails in intervals A and B means that nail tips are partially masked by the adjacent nails. At first sight, it might be assumed that intervals A and B belong to a single sequence of sedimentary layers whose dip angle increases with depth from 100 to 400. A more careful examination shows that there are two distinct layers which happen to have substantially the same dip (about 150) at their interface, but in diametrically opposite directions, i.e. southeast for interval A and northwest for interval B.

Figure 2:
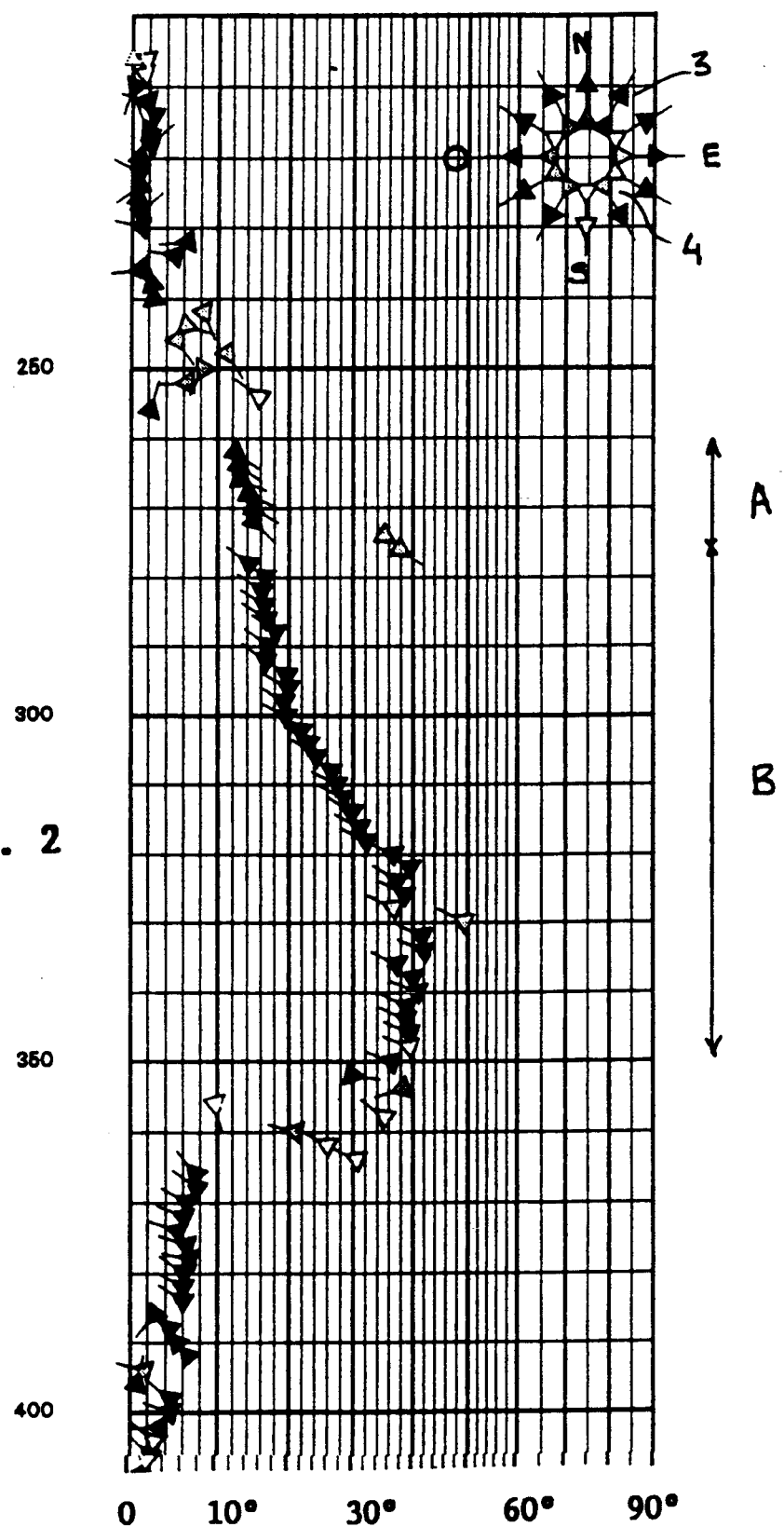
FIG. 2 is a black and white representation of a polychromatic arrow plot in accordance with the present invention established using the same measured data as were used for establishing the arrow plot of FIG. 1.

FIG. 2 shows a black and white representation of an example of a polychromatic arrow plot obtained using the method of the present invention, and using the same data as used for obtaining the arrow chart of FIG. 1. A color copy of FIG. 2 is included in the file of the present patent application.

In this example, given by way of illustration, a first palette of colors 3 reproduces a color circle which provides a correspondence between azimuth directions and a plurality of colors, with north being towards the top of the figure. By way of example, the palette comprises twelve basic colors disposed around a chromatic circle such that the colors at opposite ends of each diameter are complementary to each other. For example, blue corresponds to north, red to east, yellow to south, and green to west. In order to fit colors, which are a tristimulus system, onto a compass which has four cardinal directions, the shades of red and green used for east and west are both shifted a little towards blue and away from pure red and green respectively, while pure red and green respectively represent directions shifted towards SE and SW.

The colors of this first palette are assigned to nails as a function of the dip direction with the nails having a given dip direction being colored with the palette color corresponding to the same azimuth to provide a global indication of dip direction. The nails are preferably outlined in black with the color representing the dip direction being painted inside the heads of the nails.

Referring to intervals A and B previously discussed with reference to FIG. 1, it can be seen that there is no longer any danger of confusion in the arrow plot of FIG. 2, since the nails in intervals A and B are now red and blue, respectively.

An alternative embodiment of the above-described method consists in integrating a criterion representative of the quality of the measurement within the arrow plot: this can be done, for example, by reducing the saturation or increasing luminance of the color corresponding to a given azimuth direction of dip, i.e., the color is made paler to indicate the decreasing quality of the corresponding measurement.

A simplified form of this alternative embodiment consists in using only two criteria: good and poor. To this end, a second color circle 4 may be used situated inside the first circle 3 and organized in the same way as the first color circle. This second color circle 4 uses the same color distribution as the first circle but at very low saturation or at high luminance, thereby making the colors extremely pale.

There has been described and illustrated herein an improved method for presentation of dipmeter data. While particular embodiments have been disclosed, it should be appreciated that there is no intent to be limited thereby, but rather it is intended that the invention be as broad in scope as the art will allow, and as defined by the claims hereinbelow. Therefore, it will be apparent to those skilled in the art that modifications can be made to the described invention without deviating from the scope and spirit of the invention as claimed.

I claim:

1. A method of representing information relating to the dip of earth formations by means of an arrow plot made up of nails, each nail having a head and a tip, the method comprising:

providing a local indication of amplitude of the dip and azimuth direction of the dip with the location of each nail head and the orientation of each nail tip respectively, providing a global indication of dip azimuth direction by color coding each nail as a function of the direction of dip, the color being selected from a palette of colors that correspond to dip azimuth directions.

2. A method according to claim 1, wherein said palette of colors is a chromatic circle with azimuth references, said circle organized in such a way that any two diametrically opposite colors are complementary to each other.

3. A method according to claim 2, wherein said chromatic circle is selected such that blue corresponds to north, red to east, yellow to south, and green to west.

4. A method according to claim 1, further comprising the step of selecting said color attributed to each nail within a range of saturation or luminance values varying from pale to bright so that the selected saturation or luminance of a color is representative of the quality of the information relating to dip.

5. A method according to claim 1, wherein said color is painted in the head of each nail.

6. A method of representing information relating to the dip of earth formations by means of a graphic plot made up of oriented symbols, wherein the position of a symbol on the graphic plot is locally representative of the depth of the dip information and the degree of dip, and the orientation of the symbol is locally representative of the azimuth direction of dip, comprising:

obtaining dip information relating to a plurality of data points corresponding to characteristics of earth formations at a plurality of depths along a borehole;

globally indicating dip azimuth direction by assigning a coded color to each symbol, the color being selected from a palette of colors that correspond to dip azimuth directions; and generating a graph representative of said dip information, including a plurality of oriented symbols bearing said assigned colors.

7. A method according to claim 6, wherein said palette of colors corresponds to a chromatic circle with azimuth references, said circle organized such that any two diametrically opposite colors are complementary to each other.

8. A method according to claim 7, wherein said chromatic circle is selected such that blue corresponds to north, red to east, yellow to south, and green to west.

9. a method according to claim 6, further comprising the step of selecting, with respect to each said assigned to a symbol, a color saturation or luminance value within a range of saturation or luminance values representative of the relative quality of said information relating to the dip of earth formations.

* * * * *